(12) United States Patent
Yang (10) Patent No.: US 12,410,832 B1
(45) Date of Patent: Sep. 9, 2025

(54) NEGATIVE PRESSURE SUCTION-BASED FIXING DEVICE

(71) Applicant: SHENZHEN LISEN INTELLIGENT CO., LTD., Guangdong (CN)

(72) Inventor: Rufeng Yang, Guangdong (CN)

(73) Assignee: SHENZHEN LISEN INTELLIGENT CO., LTD., Shenzhen (CN)

( * ) Notice: Subject to any disclaimer, the term of this patent is extended or adjusted under 35 U.S.C. 154(b) by 0 days.

(21) Appl. No.: 19/037,215

(22) Filed: Jan. 26, 2025

Related U.S. Application Data (63) Continuation of application No. PCT/CN2024/095031, filed on May 23, 2024.

(51) Int. Cl.
| | |
|---|---|
| *F16B 47/00* | (2006.01) |
| *H02J 7/00* | (2006.01) |
| *H02J 7/35* | (2006.01) |
| *H02S 40/38* | (2014.01) |

(52) U.S. Cl.
CPC ............ *F16B 47/00* (2013.01); *H02J 7/0029* (2013.01); *H02J 7/35* (2013.01); *H02S 40/38* (2014.12)

(58) Field of Classification Search
CPC . F16B 47/00; H02J 7/00; H02J 7/0029; H02J 7/35; H02S 40/38
See application file for complete search history.

(56) References Cited

U.S. PATENT DOCUMENTS 11,635,106 B1  4/2023  Song

FOREIGN PATENT DOCUMENTS

| CN | 103122919 A | 5/2013 | |
| CN | 109050437 A | 12/2018 | |
| CN | 116799934 A | 9/2023 | |
| DE | 102013009344 A1 * | 12/2014 | ......... B25J 15/0616 |
| KR | 100625699 B1 | 9/2006 | |
| KR | 20140011634 A | 1/2014 | |

OTHER PUBLICATIONS

International Search Report of PCT Patent Application No. PCT/CN2024/095031 issued on Jan. 24, 2025.
Written Opinion of PCT Patent Application No. PCT/CN2024/095031 issued on Jan. 24, 2025.

* cited by examiner

*Primary Examiner* — Robert L Deberadinis (57) ABSTRACT

Disclosed is a negative pressure suction-based fixing device comprising a housing, a suction and holding member, a negative pressure creating assembly and a sealing member. The housing has an accommodating cavity thereinside. The suction and holding member has an abutting and holding surface recessed to form a suction cavity communicated with the accommodating cavity. The abutting and holding surface has a mounting structure connected to the sealing member, so that the sealing member is arranged on the abutting and holding surface for abutting against the suction surface. The sealing member can be elastically deformed to fit with the suction surface so as form an enclosed space together with the cooperation of the suction cavity and the suction surface. In this way, it is difficult for the negative pressure suction-based fixing device to fall off from a rough surface.

20 Claims, 8 Drawing Sheets

NEGATIVE PRESSURE SUCTION-BASED FIXING DEVICE

CROSS REFERENCE TO RELATED APPLICATIONS

The present application is a Continuation Application of PCT Application No. PCT/CN2024/095031 filed on May 23, 2024, the contents of which are incorporated herein by reference in their entirety.

TECHNICAL FIELD

The present disclosure relates to suction and holding apparatus, in particular to negative pressure suction-based fixing devices.

BACKGROUND OF THE INVENTION

A negative pressure suction-based fixing device is a type of equipment that allows a suction and holding member to be abutted and held on a suction surface such as a surface of a vehicle body, and generates negative pressure thereinside, allowing the suction and holding member to be firmly attached to the suction surface. Since the suction and holding member relies on internal negative pressure to generate suction force, there is a high requirement for the airtightness of the space formed by the cooperation between the suction and holding member and the suction surface, because the suction and holding member may fall off from the suction surface if air enters the space.

However, existing negative pressure suction-based fixing devices can only be suctioned onto smooth surfaces. When these devices are suctioned onto rough surfaces, it becomes difficult to form the enclosed space due to the unevenness of the rough surfaces, which often leads to detachment of the fixing devices from the rough surfaces.

SUMMARY OF THE INVENTION

The present disclosure mainly provides negative pressure suction-based fixing devices, solving the above problem that existing negative pressure suction-based fixing devices are prone to detachment when suctioned onto rough surfaces.

To address the aforementioned technical problem, the present disclosure provides a negative pressure suction-based fixing device, which may include a housing, a suction and holding member, a negative pressure creating assembly and a sealing member. The interior of the housing may comprise an accommodating cavity. The suction and holding member may have an abutting and holding surface that is recessed to form a suction cavity, which is in communication with the accommodating cavity. The abutting and holding surface may be provided with a mounting structure connected to the sealing member, such that the sealing member is arranged on the abutting and holding surface. The sealing member may be configured to be abutted and held on a suction surface, and may be capable of being elastically deformed to fit with the suction surface to form an enclosed space together with the suction cavity and the suction surface. The negative pressure creating assembly may be configured to generate negative pressure in the accommodating cavity so as to create negative pressure in the enclosed space.

In some embodiments, the sealing member is a colloid.

In some embodiments, the mounting structure includes a receiving groove, and the sealing member is disposed in the receiving groove.

In some embodiments, the receiving groove has a ring shape, surrounding the outer circumference of the suction cavity; and the sealing member has a ring shape.

In some embodiments, the negative pressure suction-based fixing device includes a release film. The release film may be covered over the side of the sealing member that is away from the housing to protect the sealing member.

In some embodiments, the negative pressure suction-based fixing device includes a solar panel and a battery. The solar panel may be disposed on the housing, with a light absorbing surface at least partially exposed through the housing, and may be configured to convert solar energy into electrical energy. The battery may be configured to supply power to the negative pressure creating assembly and may be capable of storing the electrical energy converted by the solar panel.

In some embodiments, the negative pressure suction-based fixing device includes a charging interface that is configured to connect to an external power supply to the supply power to the battery.

In some embodiments, the negative pressure suction-based fixing device comprises a first charging circuit, a second charging circuit and a comparator. The first charging circuit may include a first switching unit and may be configured to connect to the solar panel. The second charging circuit may include a second switching unit and may be configured to connect to the external power supply. One end of the first switching unit may be connected to the solar panel, and another end of the first switching unit may be connected to the battery. One end of the second switching unit may be connected to the external power supply, and another end of the second switching unit may be connected to the battery. The comparator may have a first input end connected to the first charging circuit, a second input end connected to the second charging circuit, and an output end configured to output a comparison result. The first switching unit may be closed or opened in response to the comparison result from the comparator, and the second switching unit may be closed or opened in response to the comparison result from the comparator.

In some embodiments, the first charging circuit further includes a first protection unit and the second charging circuit further includes a second protection unit. One end of the first protection unit is connected to the first switching unit, and the other end is connected to the battery. Similarly, one end of the second protection unit is connected to the second switching unit, and the other end is connected to the battery. Both the first protection unit and the second protection unit may be configured to prevent reverse current.

In some embodiments, the negative pressure suction-based fixing device further includes a magnetic member that may be disposed on the housing and may be configured to magnetically attract a part to be secured.

In some embodiments, the magnetic member can rotate relative to the housing, allowing it to move closer to or farther away from the housing during rotation, so as to adjust the angle between the magnetic member and the housing.

In some embodiments, the housing has opposite first and second ends along its axial direction, with the suction and holding member disposed at the first end, and the magnetic member disposed at the second end.

In some embodiments, the negative pressure suction-based fixing device further includes a rotating member rotatably connected to the housing via a rotating shaft, with the magnetic member fixedly disposed on it.

In some embodiments, a slot is provided on a side of the rotating member that is away from the housing, where at least part of the magnetic member is disposed.

In some embodiments, the negative pressure creating assembly includes: a cylinder barrel having a receiving cavity thereinside that is communicated with the accommodating cavity, a cylinder piston arranged in the receiving cavity, and a driving element configured to drive the cylinder piston to move in a reciprocating manner, thereby generating negative pressure in the accommodating cavity.

In some embodiments, the negative pressure suction-based fixing device further includes an activation assembly including a first movable part and a switch part, wherein an end of the first movable part may be arranged outside the accommodating cavity and another end of the first movable part may be arranged in the accommodating cavity, and the first movable part may be capable of being moved towards the interior of the accommodating cavity to actuate the switch part, thereby activating the negative pressure creating assembly.

In some embodiments, the direction of movement of the first movable part is perpendicular to the abutting and holding surface; and when the suction and holding member is suctioned onto the suction surface, the first movable part can be abutted against the suction surface, thereby suffering pressure from the suction surface to move towards the interior of the accommodating cavity.

In some embodiments, the switch part is a bi-directional switch, and the first movable part can further be moved towards the exterior of the accommodating cavity to actuate the bi-directional switch, thereby activating the negative pressure creating assembly.

In some embodiments, the negative pressure suction-based fixing device further includes an air inlet assembly configured to communicate the accommodating cavity with an exterior of the housing, allowing the suction and holding member to be detached from the suction surface.

In some embodiments, the air inlet assembly includes a second movable part with an end arranged outside the housing and another end arranged inside the housing; and when subjected to pressure, the second movable part can open an air channel between the accommodating cavity and the exterior of the housing.

As previously mentioned, the negative pressure suction-based fixing device provided in this application includes a housing with an accommodating cavity inside; a suction and holding member having an abutting and holding surface recessed to form the suction cavity in communication with the accommodating cavity and provided with a mounting structure; a sealing member connected to the sealing member and arranged on the abutting and holding surface, capable of elastically deforming to fit the suction surface and forming an enclosed space in cooperation with the suction cavity and the suction surface; and a negative pressure creating assembly configured to generate negative pressure in the accommodating cavity to create negative pressure in the enclosed space. In this way, due to the fact that the sealing member with strong deformability is arranged on the abutting and holding surface of the suction and holding member, when the negative pressure suction-based fixing device is abutted against a rough suction surface, the sealing member can be deformed into an uneven shape matching the uneven contour of the suction surface to fit with the suction surface to enhance the airtightness of the space formed by the suction and holding member, the sealing member and the suction surface, thus making it difficult for the negative pressure suction-based fixing device to fall off when suctioned onto the rough surface.

DETAILED DESCRIPTION

The present disclosure is further described in detail below through specific embodiments in combination with the drawings, wherein similar elements across different embodiments adopt associated similar element labels. In the following embodiments, many details are described to facilitate better understanding of the application. However, those skilled in the art can readily recognize that some features can be omitted in different cases or can be replaced by other elements, materials and methods. In some cases, some operations pertinent to this disclosure are not explicitly shown or described in the specification to prevent the core aspects of this disclosure from being obscured by excessive detail, and detailing these operations is not deemed necessary, as those skilled in the art can fully comprehend them based on the specification and the general technical knowledge in the field.

Furthermore, the characteristics, operations or features described in the specification may be combined in any suitable manner to form various embodiments. At the same time, the steps or actions described in the method may be sequenced, adjusted, or rearranged in a manner apparent to those skilled in the art. Therefore, the sequences in the specification and the drawings are merely intended for the clear description of an embodiment and do not necessarily represent a required sequence, unless otherwise specified as a mandatory sequence.

The serial numbers, such as "first", "second", etc., assigned to the parts in this document are only used to distinguish the described objects and do not have any sequential or technical meaning. The terms "connect" and "couple" used in this document, unless specifically stated otherwise, refer to both direct and indirect connections (couplings).

The present disclosure provides a negative pressure suction-based fixing device that can be suctioned onto a suction surface. This device may be provided with a connecting part, allowing a part to be secured to be secured onto the device, thus achieving fixation of the part to be secured on the suction surface. The connection between the connecting part and the part to be secured can include, but is not limited to, buckle connection, magnetic snap connection, and interference fit connection. In an exemplary application, the device may be used in a vehicle-mounted environment; where it can be secured on a vehicle body, enabling an electronic device to be fixed onto the device by the connecting part, so that the content displayed by the electronic device can be viewed by users. Of course, the negative pressure suction-based fixing device provided in the present disclosure is not limited to the vehicle-mounted environments, and it can be used in any context that requires fixation of a part to be secured.

Please refer to FIGS. 1-5. The negative pressure suction-based fixing device may include a housing 10, a suction and holding member 20, a negative pressure creating assembly 30 and a sealing member 40. The housing 10 may have an accommodating cavity 11 inside. Specifically, the housing 10 may include an upper housing and a lower housing. These two housings may be detachably connected and together form the accommodating cavity 11.

Figure 2:
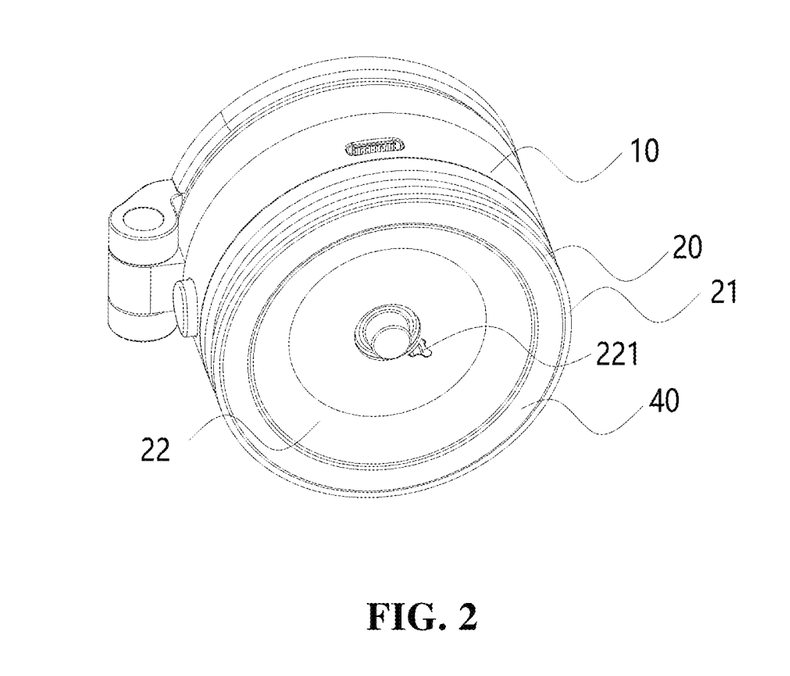
FIG. 2 is a schematic structural diagram of a negative pressure suction-based fixing device in some embodiments of the present disclosure from another perspective.

The suction and holding member 20 may be designed to be suctioned onto a suction surface. It can be disposed on the housing 10, for instance, on an end face of the housing 10 along its axial direction or on an annular side wall of the housing 10. As shown in FIG. 2, an end of the suction and holding member 20 away from the housing 10 may have an abutting and holding surface 21. The abutting and holding surface 21 may be recessed to form a suction cavity 22 that may be in communication with the accommodating cavity 11; that is, the internal gas pressure in the suction cavity 22 may be the same as that in the accommodating cavity 11. Examples of the suction and holding member 20 may include a suction cup or a suction ring. To prevent air leakage from an enclosed space between the suction and holding member 20 and the suction surface, the material of the suction and holding member 20 may be made of a flexible material. The flexible material may be deformable, allowing for better attachment of the suction and holding member 20 to the suction surface.

The abutting and holding surface may be provided with a mounting structure designed to secure the sealing member 40. The sealing member 40 may be connected to the mounting structure so as to be arranged on the abutting and holding surface 21. The sealing member 40 may be designed to abut against the suction surface and can be elastically deformed to conform to the surface of the suction surface. This allows the suction cavity 22, the sealing member 40 and the suction surface to cooperate to form the enclosed space. For example, in some embodiments, the sealing member 40 may be a colloid, such as a semi-solid, soft colloid like a gel. Compared to harder colloids such as rubber, semi-solid and soft colloids exhibit stronger elastic deformation capabilities and can more effectively adapt to the uneven shapes of suction surfaces.

The negative pressure creating assembly 30 may be designed to generate negative pressure within the accommodating cavity 11. Since the accommodating cavity 11 is in communication with the enclosed space, the negative pressure creating assembly 30 can create negative pressure in the enclosed space, allowing the suction and holding member 20 to generate a suction and holding effect due to negative pressure. The negative pressure creating assembly 30 can be powered on to stably generate negative pressure in the enclosed space, which is more stable and reliable than natural suction methods, such as by squeezing out the air in the enclosed space to make the suction and holding member 20 attach to the suction surface.

The negative pressure suction-based fixing device may be provided with the sealing member 40 with strong deformability on the abutting and holding surface 21 of the suction and holding member 20. Accordingly, when the negative pressure suction-based fixing device is abutted against a rough suction surface, the sealing member 40 can deform to match the uneven contour of the rough suction surface, ensuring a secure fit with the surface. This allows the suction and holding member 20 to enhance the airtightness of the space formed between it and the suction surface via the sealing member 40, making it difficult for the negative pressure suction-based fixing device to detach from the rough surface.

Figure 4:
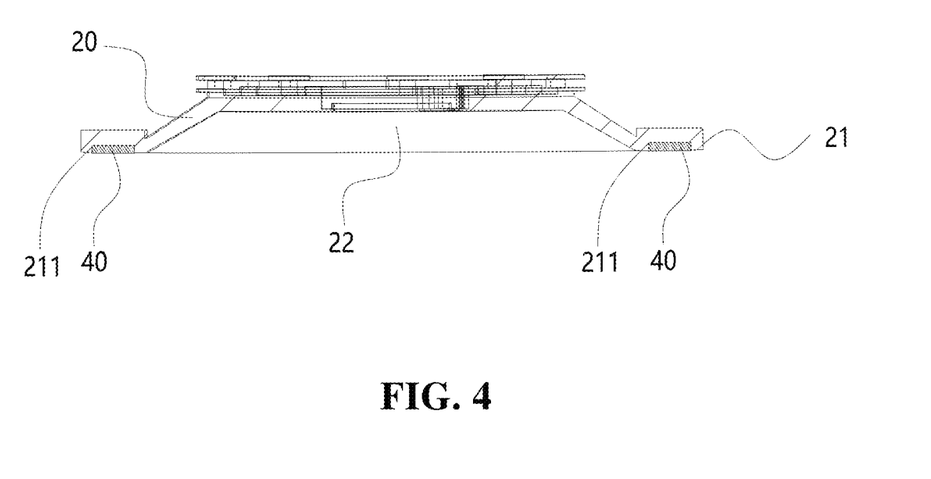
FIG. 4 is a schematic section view of a suction and holding member and a sealing member in some embodiments of the present disclosure.

As shown in FIGS. 2 and 4, in some embodiments, the mounting structure includes a receiving groove 211, and the sealing member 40 is disposed within this groove. In this way, the connection between the sealing member 40 and the suction and holding member 20 is more reliable, preventing the sealing member 40 from falling off the suction and holding member 20. Specifically, the thickness of the sealing member 40 may be slightly greater than the depth of the receiving groove 211, so that when the negative pressure suction-based fixing device is abutted against the suction surface, the suction surface may be abutted against the sealing member 40, resulting in a better sealing effect for the enclosed space compared with the suction and holding member 20 abutted against the suction surface.

In some embodiments, the receiving groove 211 may be annular and arranged around the outer circumference of the suction cavity 22, and the sealing member 40 may also be designed in an annular shape. This annular shape of the sealing member 40 enables the outer circumference of the suction cavity 22 to achieve good sealing with the suction surface, thereby enhancing the sealing performance of the enclosed space. The annular shape may be, for example, a circular ring, a square ring, or any other irregularly shaped ring, as long as it is enclosed.

Figure 5:
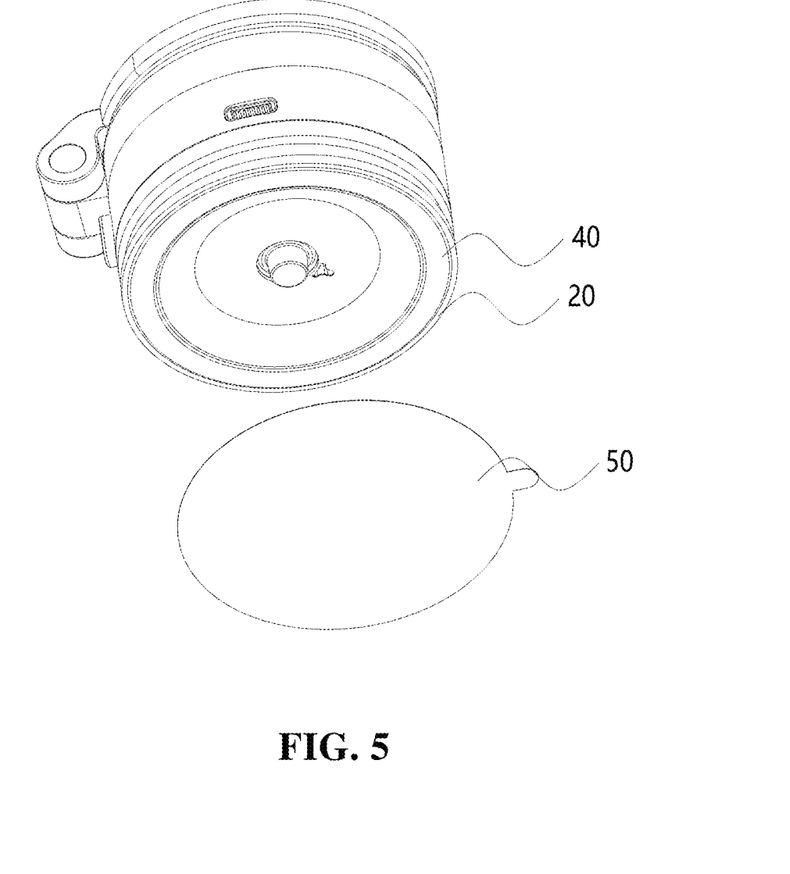
FIG. 5 is a schematic structural diagram of a negative pressure suction-based fixing device in other embodiments of the present disclosure.

Referring to FIG. 5, in some embodiments, the negative pressure suction-based fixing device may also include a release film 50 that is covered over the side of the sealing member 40 away from the housing 10 to protect the sealing member 40. When in the as-shipped condition, the release film 50 can protect the sealing member 40 during transportation and storage, preventing dust from sticking to the surface of the sealing member 40. If the surface of the sealing member 40 adheres to too many solid particles stick to, it may lead to a reduction in the sealing performance of the enclosed space, resulting in poor suction of the negative pressure suction-based fixing device.

Figure 3:
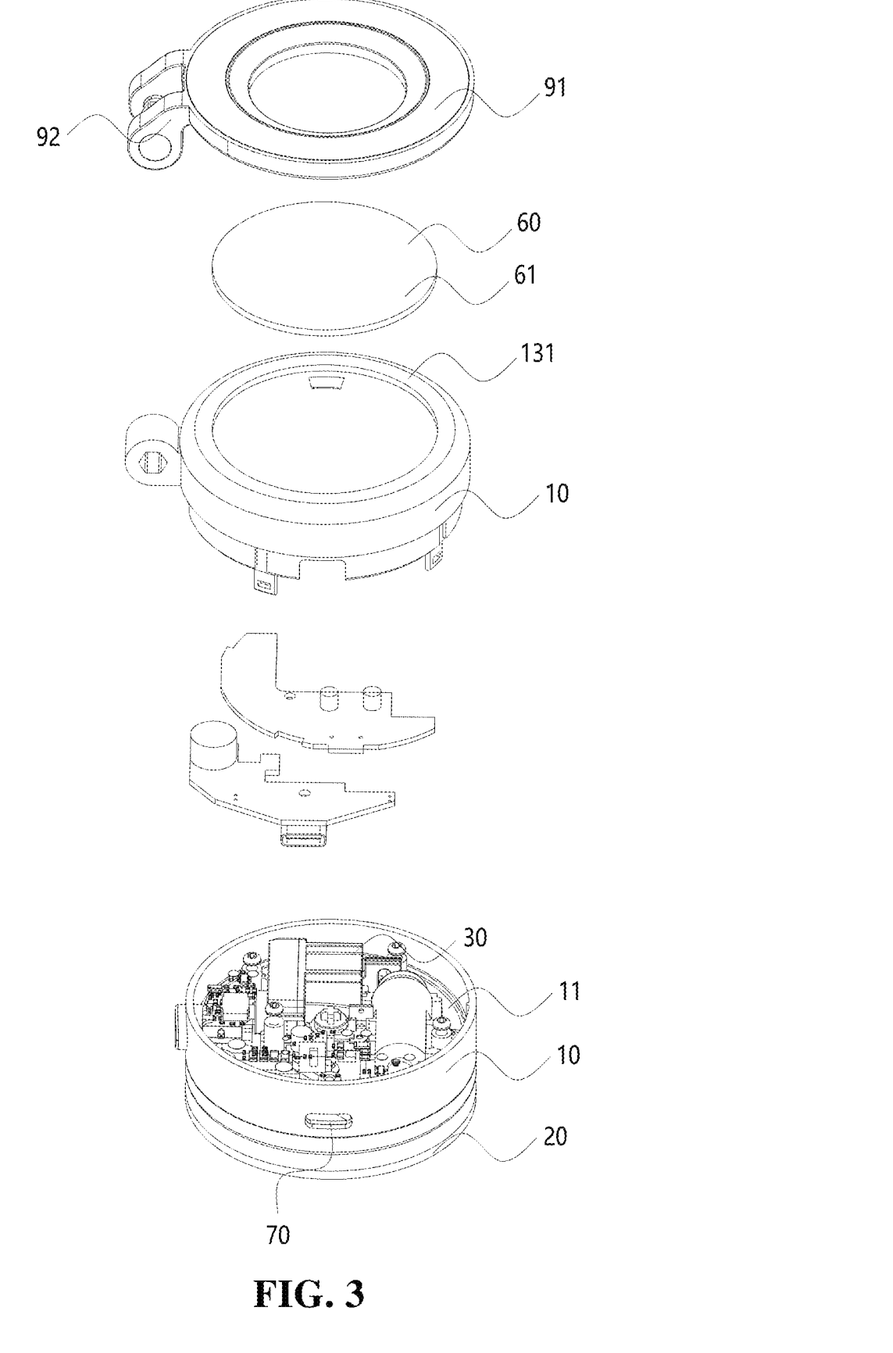
FIG. 3 is a schematic exploded diagram of the structure shown in FIG. 1.

Referring to FIG. 3, the negative pressure suction-based fixing device may also include a solar panel 60 and a battery. The solar panel 60 may be a component capable of converting solar energy into electrical energy. The solar panel 60 may be disposed on the housing 10 and may have a light absorbing surface 61. At least a portion of the light absorbing surface 61 may be exposed through the housing 10. Preferably, to enhance the energy conversion efficiency of the solar panel 60, the entire light absorbing surface 61 may be exposed through the housing 10, allowing the solar panel 60 to fully harness solar energy. The battery may be configured to supply power to the negative pressure creating assembly 30 and may be capable of storing the electrical energy converted by the solar panel 60. With the solar panel 60 disposed on the housing 10, during daytime driving, the solar panel 60 can convert solar energy into electrical energy and store it into the battery. This means that during daytime, the solar panel 60 can continuously supply power to the battery, enabling the battery to continuously supply power to the negative pressure creating assembly 30. This improves the battery life of the negative pressure suction-based fixing device, reducing the need for frequent power charging and enhancing user experience. Even when not driving during daytime, the solar panel 60 can convert solar energy into electrical energy, compensating for the natural discharge of the battery during periods of non-use, ensuring that the battery of the negative pressure suction-based fixing device can also have sufficient power supply at night.

Figure 6:
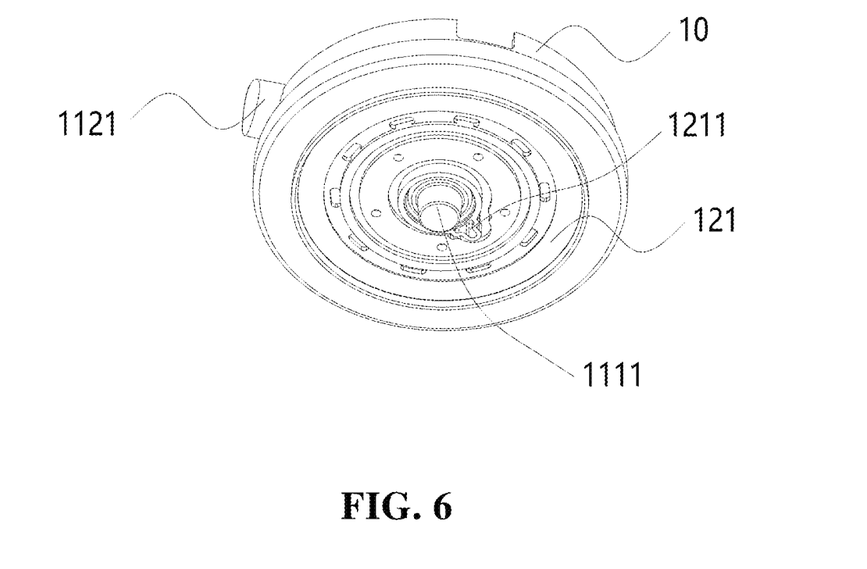
FIG. 6 is a schematic structural diagram of a negative pressure suction-based fixing device without a suction and holding member in some embodiments of the present disclosure.

As shown in FIG. 3 and FIG. 6, in some embodiments, the housing 10 may have a first end face 121 and a second end face 131 that are axially opposite to each other on the housing 10. The suction and holding member 20 may be disposed on the first end face 121 of the housing 10. The wall of the suction cavity 22 may be provided with a first through-hole 221, and the first end face 121 of the housing 10 may be provided with a second through-hole 1211. The suction cavity 22 may be in communication with the accommodating cavity 11 via the first through-hole 221 and the second through-hole 1211. The solar panel 60 may be disposed on the second end face 131 of the housing 10. Since the suction and holding member 20 is disposed on the first end face 121 of the housing 10, which typically faces the vehicle body, while the second end face 131 of the housing 10 faces the vehicle window, disposing the solar panel 60 on the second end face 131 of the housing 10 is advantageous for the solar panel 60 to absorb solar energy through the window.

As shown in FIG. 3, in some embodiments, the negative pressure suction-based fixing device further includes a charging interface 70 that is configured to connect to an external power supply to supply power to the battery. Even though the solar panel 60 can be used to charge the battery, the battery's stored energy may be depleted during long periods of travel at night. Therefore, in some embodiments, the negative pressure suction-based fixing device may incorporate two charging modes: charging with the solar panel 60 and charging with the external power supply, enhancing the reliability of the negative pressure suction-based fixing device during nighttime or cloudy/rainy conditions.

Figure 7:
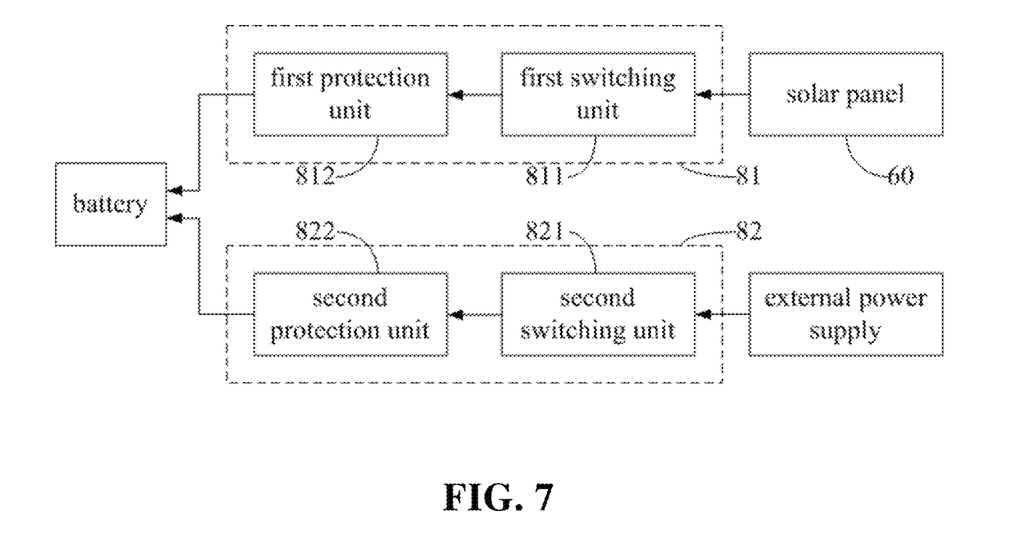
FIG. 7 is a block diagram of a charging circuit of a negative pressure suction-based fixing device in some embodiments of the present disclosure.
Figure 8:
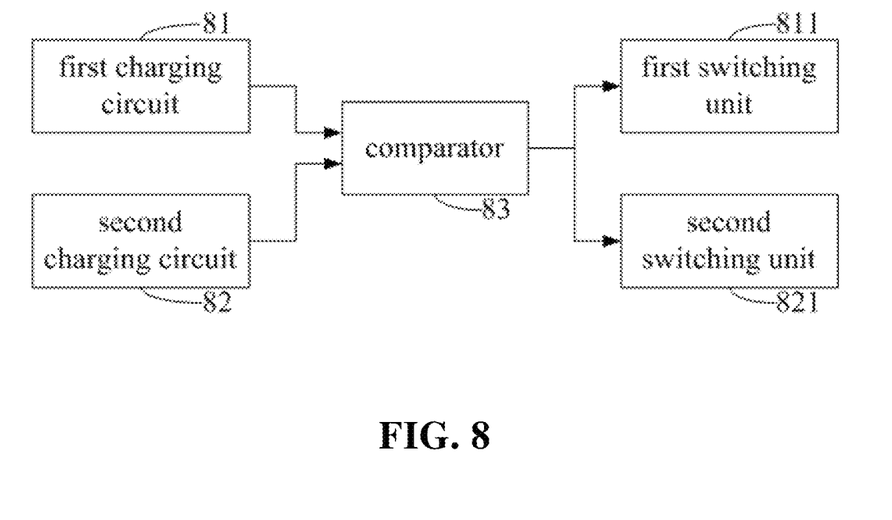
FIG. 8 is a block diagram of a connection structure for a comparator in some embodiments of the present disclosure.

Further, in some embodiments, referring to FIG. 7 and FIG. 8, the negative pressure suction-based fixing device may also include a first charging circuit 81, a second charging circuit 82 and a comparator 83. The first charging circuit 81, which may include a first switching unit 811, may be designed to connect to the solar panel 60. The second charging circuit 82, which may include a second switching unit 821, may be designed to connect to the external power supply.

One end of the first switching unit 811 may be connected to the solar panel 60, and another end of the first switching unit 811 may be connected to the battery. One end of the second switching unit 821 may be connected to the external power supply, and another end of the second switching unit 821 may be connected to the battery. The first input end of the comparator 83 may be connected to the first charging circuit 81, and the second input end of the comparator 83 may be connected to the second charging circuit 82. The output end of the comparator 83 may be configured to output a comparison result that is may be, for example, the comparison of the charging current between the first charging circuit 81 and the second charging circuit 82. The first switching unit 811 may respond to the comparison result from the comparator 83 by switching on or off, and similarly, the second switching unit 821 may also respond to the comparison result by switching on or off.

For example, when the solar panel 60 charges the battery, if the external power supply is not connected and the first charging circuit 81 is greater than that of the second charging circuit 82, the comparator 83 may output a first comparison result. In response to this, the first switching unit 811 is in the on state and the second switching unit 821 is in the off state. When the external power supply is connected, and the charging current of the second charging circuit 82 is greater than that of the first charging circuit 81, the comparator 83 may output a second comparison result. In response to this, the first switching unit 811 is in the off state and the second switching unit 821 is in the on state. This means that when the external power supply is connected, it ensures that the second charging circuit 82, powered by the external power supply, is connected, while the first charging circuit 81, powered by the solar panel 60, is disconnected. This prevents both charging modes from operating simultaneously.

Furthermore, in some embodiments, the first charging circuit 81 may also comprise a first protection unit 812, and the second charging circuit 82 may also comprise a second protection unit 822. One end of the first protection unit 812 may be connected to the first switching unit 811, and another end may be connected to the battery. One end of the second protection unit 822 may be connected to the second switching unit 821, and another end may be connected to the battery. These protection units 812, 822 may be designed to prevent reverse current. The first protection unit 812 and the second protection unit 822 may be, for example, diodes.

Figure 1:
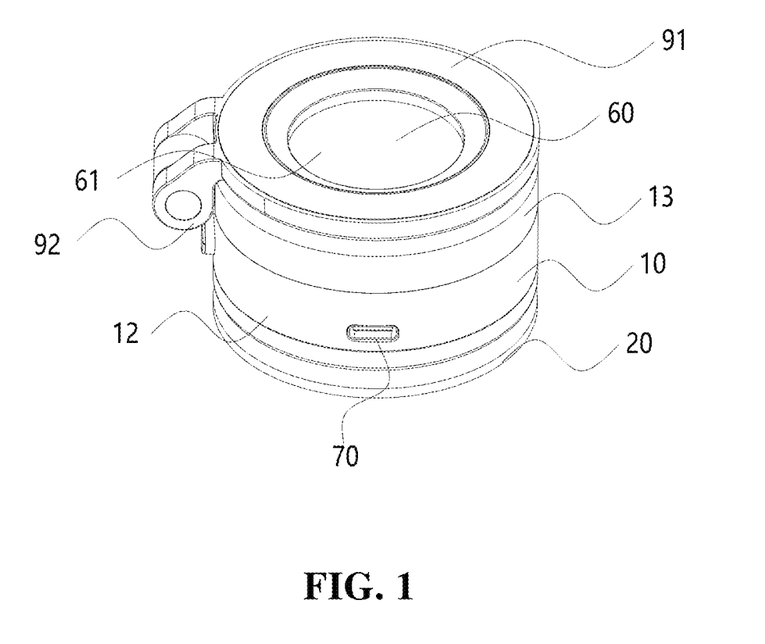
FIG. 1 is a schematic structural diagram of a negative pressure suction-based fixing device in some embodiments of the present disclosure from a perspective.

In some embodiments, as shown in FIGS. 1-3, the negative pressure suction-based fixing device may also comprise a magnetic member 91 disposed on the housing 10. Preferably, the magnetic member 91 may be disposed on an end of the housing 10 away from the first end face 121. In some examples, the magnetic member 91 may be disposed on the side of the solar panel 60 away from the housing 10, and may expose at least a portion of the light absorbing surface 61. For example, the magnetic member may be designed in an annular or curved shape.

The magnetic member 91 may be configured to magnetically attract a part to be secured. Specifically, in some embodiments, the connecting part may be configured as the magnetic member 91. For instance, in applications involving the securing of electronic equipment, the suction and holding member 20 may be used to be suctioned and supported on the vehicle body, and the magnetic member 91 may be used to magnetically attract the electronic equipment. Of course, the magnetic member 91 may be used to magnetically attract the vehicle body, while the suction and holding member 20 may be used to suction and support the electronic equipment. Generally, the housing of the electronic equipment may be made of metal material which can magnetically attract the magnetic member 91. Alternatively, the interior of the electronic equipment may be provided with a metal or magnetic part that can magnetically attach to the magnetic member 91. In this respect, leveraging the typical characteristics of the electronic equipment enables a reliable connection between the electronic equipment and the negative pressure suction-based fixing device.

Additionally, in some embodiments, the negative pressure suction-based fixing device may also include a wireless charging coil that can charge an electronic equipment wirelessly when the magnetic member 91 is magnetically attracted by the electronic equipment.

Figure 9:
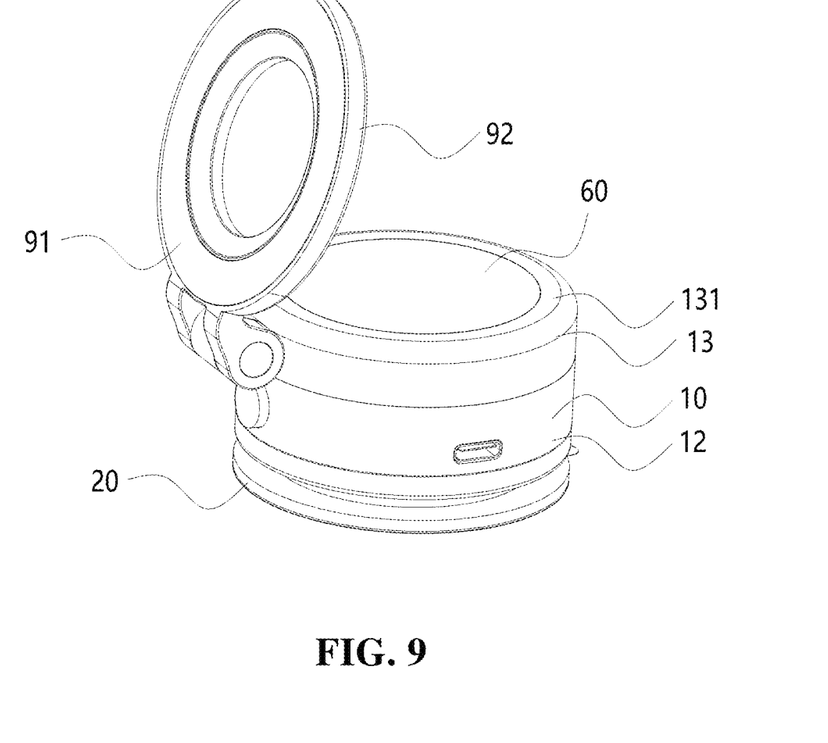
FIG. 9 is a schematic structural diagram of a magnetic member rotated in some embodiments of the present disclosure.
Figure 10:
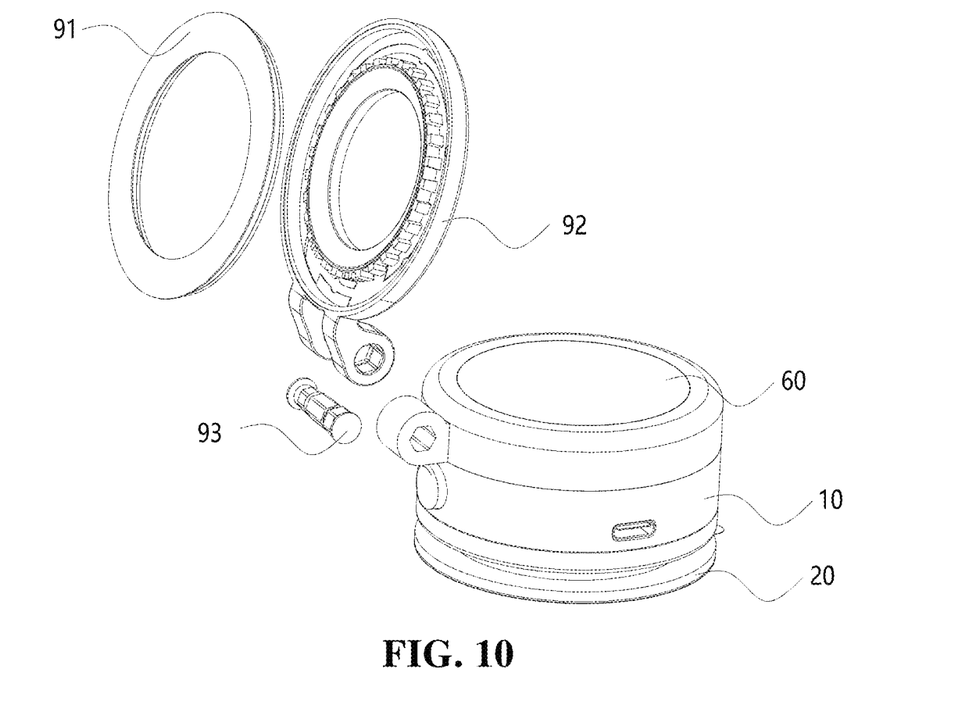
FIG. 10 is a schematic exploded diagram of the structure shown in FIG. 9.

In some embodiments, as shown in FIG. 9 and FIG. 10, the magnetic member 91 can be rotated relative to the housing 10 to allow the magnetic member 91 to move closer and farther away from the housing 10, so as to adjust an angle between the magnetic member 91 and the housing 10. Since the housing 10 is secured to the suction surface by the suction and holding member 20, and the housing 10 is relatively fixed in position with respect to the suction surface, the rotation of the magnetic member 91 relative to the housing 10 is equivalent to the rotation of the magnetic member 91 relative to the suction surface, and this rotation can adjust the angle between the magnetic member 91 and the suction surface. In an vehicle-mounted environment, when the housing 10 is secured to the vehicle body by the suction and holding member 20, the magnetic member 91 may be driven to rotate relative to the housing 10 to adjust an angle of an electronic device secured to the magnetic member 91 relative to a driving seat, so that an appropriate angle of the display screen of the electronic device facing towards to a user can be chosen by the user. In this way, the angle of the electronic device can be adjusted without needing to detach the negative pressure suction-based fixing device, providing convenience to the user. Moreover, the rotation angle of the magnetic member 91 relative to the housing 10 is large, allowing the angle of the electronic device relative to the user to be not overly restricted by the structure of the vehicle body, which can meet the needs for adjusting the angle of the part to be secured relative to the driving seat within a wide range.

Accordingly, with the negative pressure suction-based fixing device presented in the present disclosure, the magnetic member 91 is capable of magnetically attracting the part to be secured by mounting the magnetic member 91 on the housing 10, allowing the negative pressure suction-based fixing device to be detachably connected to the part to be secured. Moreover, the magnetic member 91 can be magnetically connected to the part to be secured, whether it is on the side close to the housing or on the side far away from the housing; and the part to be secured can be rotated at any angle along the contact surface where magnetic attraction occurs, making the relative position of the negative pressure suction-based fixing device and the part to be secured change more variable. Furthermore, by designing the magnetic member 91 to be rotated relative to the housing 10 to adjust the angle between the magnetic member 91 and the housing 10, the angle of the part to be secured, which is connected to the magnetic member 91, relative to the suction surface can be adjusted without removing the negative pressure suction-based fixing device, thus meeting the needs for the user to conveniently adjust the angle of the part to be secured relative to the suction surface in a wide range.

Please refer to FIG. 9 and FIG. 10, in some embodiments, the housing 10 may have a first end 12 and a second end 13 that are opposite to each other along the axial direction of the housing 10. The suction and holding member 20 may be disposed on the first end 12 of the housing 10, and the magnetic member 91 may be disposed on the second end 13 of the housing 10. The first end 12 may include a first end face 121 and a part of the annular side wall of the housing 10 close to the first end face 121, and the second end 13 may include a second end face 131 and a part of the annular side wall of the housing 10 close to the second end face 131. By disposing the suction and holding member 20 and the magnetic member 91 at both ends of the housing 10, in general, the suction and holding member 20 may be suctioned and supported on the suction surface, the location of the magnetic member 91 may be further away from the suction surface, the magnetic member 91 is less likely to be interfered by the suction surface when rotating, thus allowing for a larger rotation angle of the magnetic member 91.

The magnetic member 91 may rotate relative to the housing 10 along a rotating shaft 93, and the axial direction of the rotating shaft 93 may be perpendicular to the axial direction of the housing 10. In some embodiments, the housing 10 may be approximately cylindrical in shape, with the axial direction of the rotating shaft being perpendicular to the axial direction of the cylinder. The rotation angle α between the magnetic member 91 and the housing 10 may range from more than 0 to 270 degrees, i.e. $0<\alpha\leq270$ degrees. In some embodiments, the second end face 131 of the housing 10 may be configured as a plane, and when the magnetic member 91 is in an initial state, the magnetic member 91 may be arranged in a stacked manner on the second end face 131, the angle between a face of the magnetic member 91 close to the second end face 131 and the second end face 131 is 0 degrees; and when the magnetic member 91 starts rotating from the initial state, the magnetic member 91 may be rotated in a direction away from the second end face 131.

As shown in FIG. 9 and FIG. 10, in some embodiments, the negative pressure suction-based fixing device may also include a rotating member 92 that is rotatably connected to the housing 10 by the rotating shaft 93. The magnetic member 91 may be fixedly disposed on the rotating member 92. Since it is difficult to modify the structure of the magnetic member 91 to install the rotating shaft 93, in some embodiments, the magnetic member 91 may be secured to the rotating member 92, so that the magnetic member 91 can be rotatably connected to the housing 10. The magnetic member 91 may be disposed on the rotating member in a non-removable connection or a removable connection. In some embodiments, the side of the rotating member 92 away from the housing 10 may be provided with a slot, and at least a portion of the magnetic member 91 may be disposed in the slot. A cover may be arranged on the slot and may serve as a protective cover to protect the magnetic member 91 inside the rotating member 92. In other embodiments, the magnetic member 91 may be embedded within the rotating member 92 or attached to the surface of the rotating member 92 using methods such as adhesive.

Figure 11:
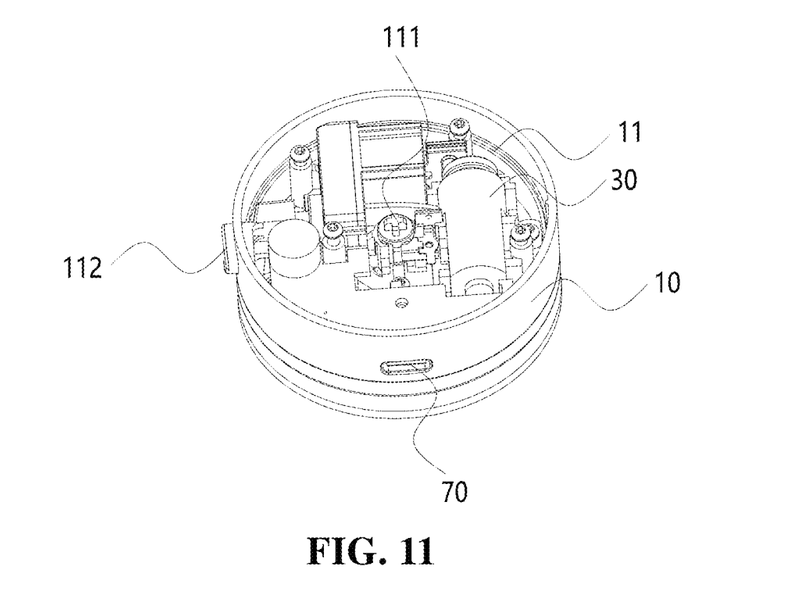
FIG. 11 is a schematic structural diagram of a lower housing, a negative pressure creating assembly, an activation assembly and an air inlet assembly in some embodiments of the present disclosure.
Figure 12:
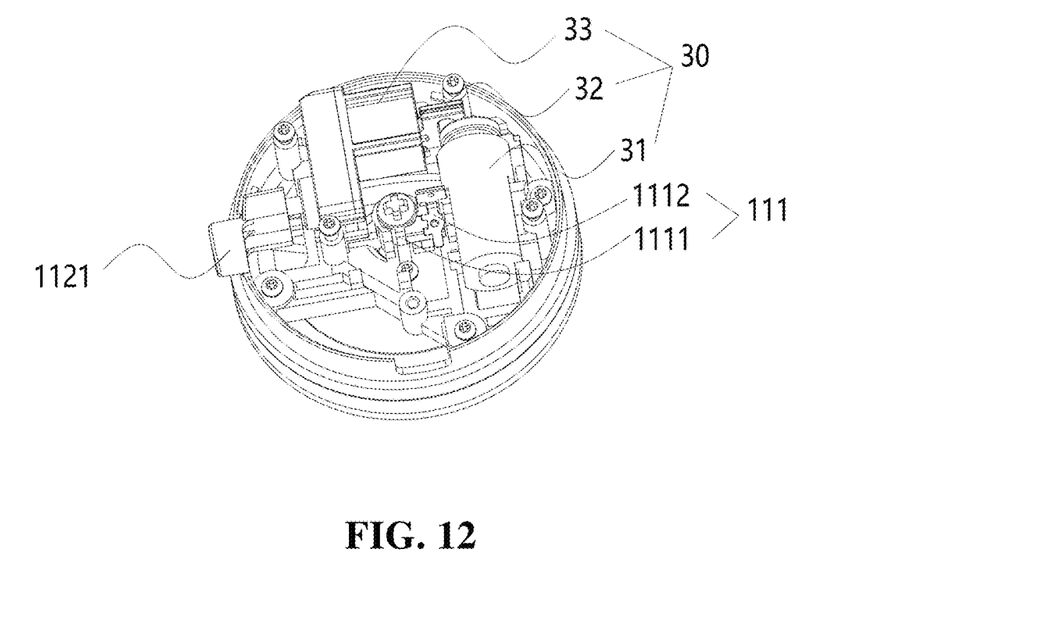
FIG. 12 is a schematic structural diagram of a negative pressure creating assembly, an activation assembly and an air inlet assembly in some embodiments of the present disclosure.
Figure 13:
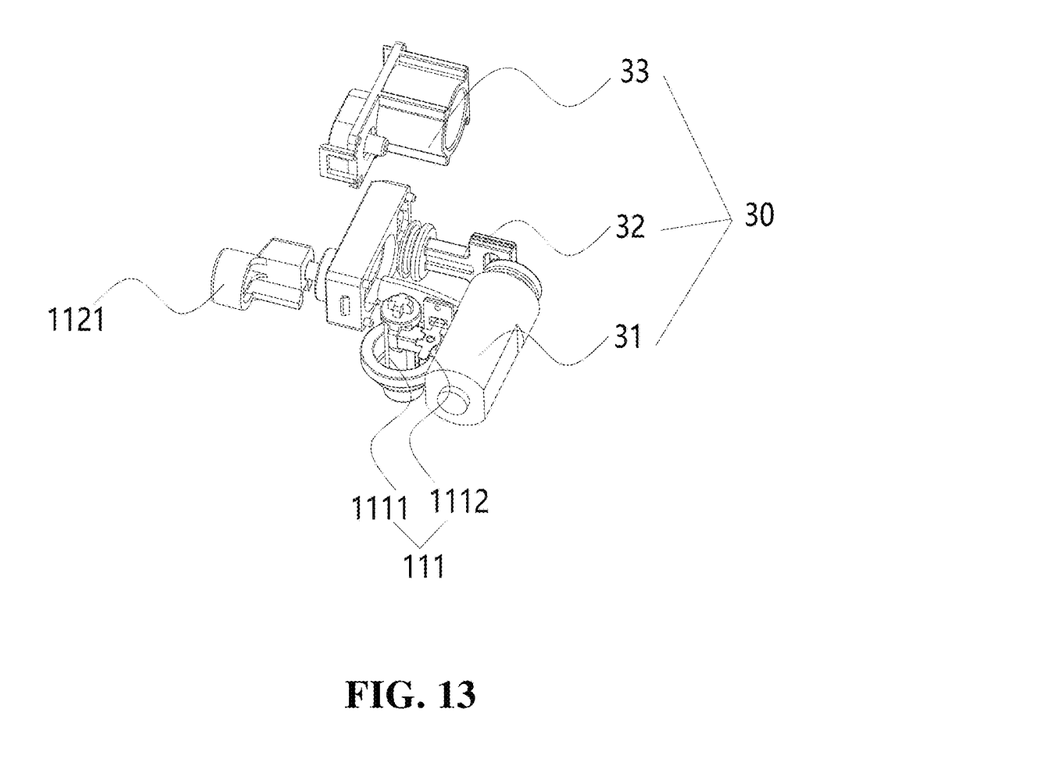
FIG. 13 is a schematic structural diagram of a negative pressure creating assembly (in an exploded view), an activation assembly and an air inlet assembly in some embodiments of the present disclosure.

As shown in FIGS. 11-13, in some embodiments, the negative pressure creating assembly 30 may include a driving element 31, a cylinder piston 32 and a cylinder barrel 33. Inside the cylinder barrel 33, there may be a receiving cavity that is communicated with the accommodating cavity 11 and accommodates the cylinder piston 32. The driving element 31 may be configured to drive the cylinder piston 32 to reciprocate, which generates negative pressure within the accommodating cavity 11. Since the negative pressure creating assembly 30 is driven by the driving element 31, this allows the user to control the operation of the negative pressure creating assembly 30 by controlling the starting and stopping of the driving element 31.

The driving element 31 may be a motor. The output shaft of the motor may drive the cylinder piston 32 to move through a transmission mechanism, for example, driving the cylinder piston 32 to reciprocate via a crank mechanism.

As shown in FIGS. 11-13, in some embodiments, the negative pressure suction-based fixing device may also include an activation assembly 111 that includes a first movable part 1111 and a switch part 1112. An end of the first movable part 1111 may be arranged outside the accommodating cavity 11, and another end of the first movable part 1111 may be arranged inside the accommodating cavity 11. The first movable part 1111 may be capable of moving towards the interior of the accommodating cavity 11 to actuate the switch part 1112 to activate the negative pressure creating assembly 30. This allows the user to operate the first movable part 1111 from the exterior of the housing 10 to activate the negative pressure creating assembly 30, facilitating easy operation of the first movable part 1111 by the user, and also allowing the user to decide when to perform negative pressure suction.

In some embodiments, the direction of movement of the first movable part 1111 may be perpendicular to the abutting and holding surface 21. When the suction and holding member 20 is suctioned onto the suction surface, the first movable part 1111 can be abutted against the suction surface to be moved towards the interior of the accommodating cavity 11 under pressure from the suction surface, thus activating the negative pressure creating assembly 30. In this way, when the suction and holding member 20 is pressed onto the suction surface by the user, the first movable part 1111 can be activated on its own, enabling the negative pressure creating assembly 30 to operate simultaneously with the user's pressing action. There is no need for the user to manipulate the first movable part 1111, thereby simplifying the activation process of the negative pressure creating assembly 30. Preferably, the portion of the first movable part 1111 located outside the housing 10 is arranged inside the suction cavity 22 of the suction and holding member 20. Of course, in other embodiments, the portion of the first movable part 1111 located outside the housing 10 may be arranged outside the suction cavity 22.

In some embodiments, the switch part 1112 may be a bi-directional switch, and the first movable part 1111 can also move towards the exterior of the accommodating cavity 11, actuating the bi-directional switch so as to activate the negative pressure creating assembly 30. As the suction and holding member 20 may loosen during suction and support, when it loosens, the negative pressure suction-based fixing device may need to be pressed again, which is troublesome. With the provision of the bi-directional switch, the negative pressure creating assembly 30 may be activated when the first movable part 1111 is pressed or released, thereby preventing the loosening of the suction and holding member 20 and allowing the suction and holding member 20 to be more stably suctioned onto the suction surface.

As shown in FIGS. 11-13, in some embodiments, the negative pressure suction-based fixing device may also include an air inlet assembly 112 configured to communicate the accommodating cavity 11 with the exterior of the housing 10, enabling the suction and holding member 20 to be separated from the suction surface. With the provision of the air inlet assembly 112, the user can actively and smoothly separate the suction and holding member 20 from the suction surface. For example, the air inlet assembly 112 may include a second movable part 1121 and a blocking part. An end of the second movable part 1121 may be arranged outside the housing 10, and another end of the second movable part 1121 may be arranged inside the housing 10. The second movable part 1121, when subjected to pressure, may enable the blocking part to move to communicate the air channel between the accommodating cavity 11 and the exterior of the housing 10.

In other embodiments, the negative pressure suction-based fixing device can also allow to press a button, which disconnects the circuit of the negative pressure creating assembly 30, causing it to stop working, thus enabling the user to remove the suction and holding member 20 from the suction surface.

The present application has been illustrated above with reference to specific embodiments, which are merely provided for the purpose of understanding the present application and are not intended to limit the scope of the present application. For those skilled in the art, it is possible to make certain simple derivations, modifications, or substitutions based on the principles of the present application.

The invention claimed is:

1. A negative pressure suction-based fixing device, comprising
    a housing having an accommodating cavity thereinside;
    a suction and holding member having an abutting and holding surface that is recessed to form a suction cavity in communication with the accommodating cavity and is provided with a mounting structure;
    a sealing member that is connected to the mounting structure to be arranged on the abutting and holding surface, wherein the sealing member is configured to be abutted and held on a suction surface, and is capable of being elastically deformed to fit with the suction surface so as to form an enclosed space cooperatively with the suction cavity and the suction surface, wherein the sealing member is a colloid; and
    a negative pressure creating assembly configured to generate negative pressure in the accommodating cavity so as to create negative pressure in the enclosed space.

2. The negative pressure suction-based fixing device according to claim 1, wherein the mounting structure includes a receiving groove, and the sealing member is mounted in the receiving groove.

3. The negative pressure suction-based fixing device according to claim 2, wherein the receiving groove is ring-shaped and arranged around an outer circumference of the suction cavity; and the sealing member is ring-shaped.

4. The negative pressure suction-based fixing device according to claim 1, further comprising a release film that is covered over a side of the sealing member away from the housing to protect the sealing member.

5. The negative pressure suction-based fixing device according to claim 1, further comprising:
    a solar panel mounted on the housing and configured to convert solar energy into electrical energy, with a light absorbing surface that is at least partially exposed through the housing; and
    a battery configured to supply power to the negative pressure creating assembly and be capable of storing the electrical energy converted by the solar panel.

6. The negative pressure suction-based fixing device according to claim 5, further comprising a charging interface configured to connect to an external power supply to supply power to the battery.

7. The negative pressure suction-based fixing device according to claim 6, further comprising:
- a first charging circuit configured to connect to the solar panel and having a first switching unit that has one end connected to the solar panel and another end connected to the battery;
- a second charging circuit configured to connect to the external power supply and having a second switching unit that has one end connected to the external power supply and another end connected to the battery; and
- a comparator having a first input end connected to the first charging circuit, a second input end connected to the second charging circuit, and an output end configured to output a comparison result, such that the first switching unit and the second switching unit are each responsive to the comparison result from the comparator to be in an on or off state.

8. The negative pressure suction-based fixing device according to claim 7, wherein
- the first charging circuit further comprises a first protection unit configured to prevent reverse current and having one end connected to the first switching unit and another end connected to the battery; and
- the second charging circuit further comprises a second protection unit configured to prevent reverse current and having one end connected to the second switching unit and another end connected to the battery.

9. The negative pressure suction-based fixing device according to claim 1, further comprising a magnetic member mounted on the housing and configured to magnetically attract a part to be secured.

10. The negative pressure suction-based fixing device according to claim 9, wherein the magnetic member is capable of rotating relative to the housing to move closer to or farther away from the housing, so as to adjust an angle between the magnetic member and the housing.

11. The negative pressure suction-based fixing device according to claim 10, wherein the housing has opposite first and second ends along its axial direction, with the suction and holding member mounted at the first end of the housing and the magnetic member at the second end of the housing.

12. The negative pressure suction-based fixing device according to claim 10, further comprising a rotating member rotatably connected to the housing via a rotating shaft, with the magnetic member fixedly mounted thereon.

13. The negative pressure suction-based fixing device according to claim 12, wherein a side of the rotating member away from the housing is provided with a slot, and at least a portion of the magnetic member is mounted in the slot.

14. The negative pressure suction-based fixing device according to claim 1, the negative pressure creating assembly comprises:
- a cylinder barrel having inside a receiving cavity in communication with the accommodating cavity;
- a cylinder piston arranged in the receiving cavity; and
- a driving element configured to drive the cylinder piston to reciprocate so as to generate negative pressure within the accommodating cavity.

15. The negative pressure suction-based fixing device according to claim 1, further comprising an activation assembly including:
- a first movable part having one end arranged outside the accommodating cavity and another end arranged in the accommodating cavity, and being capable of moving towards an interior of the accommodating cavity; and
- a switch part configured to be actuated by movement of the first movable part towards the interior of the accommodating cavity so as to activate the negative pressure creating assembly.

16. The negative pressure suction-based fixing device according to claim 15, wherein a direction of the movement of the first movable part is perpendicular to the abutting and holding surface; and when the suction and holding member is suctioned onto the suction surface, the first movable part is capable of abutting against the suction surface, thereby suffering pressure from the suction surface to move towards the interior of the accommodating cavity.

17. The negative pressure suction-based fixing device according to claim 15, wherein the switch part is a bi-directional switch; and the first movable part is further capable of being moved towards an exterior of the accommodating cavity to actuate the bi-directional switch so as to activate the negative pressure creating assembly.

18. The negative pressure suction-based fixing device according to claim 1, further comprising an air inlet assembly configured to communicate the accommodating cavity with an exterior of the housing, allowing the suction and holding member to be detached from the suction surface.

19. The negative pressure suction-based fixing device according to claim 18, wherein the air inlet assembly comprises a second movable part having one end disposed outside the housing and another end disposed inside the housing, capable of opening an air channel between the accommodating cavity and the exterior of the housing when subjected to pressure.

20. A negative pressure suction-based fixing device, comprising
- a housing having an accommodating cavity thereinside;
- a suction and holding member having an abutting and holding surface that is recessed to form a suction cavity in communication with the accommodating cavity and is provided with a mounting structure;
- a sealing member that is connected to the mounting structure to be arranged on the abutting and holding surface, wherein the sealing member is configured to be abutted and held on a suction surface, and is capable of being elastically deformed to fit with the suction surface so as to form an enclosed space cooperatively with the suction cavity and the suction surface;
- a negative pressure creating assembly configured to generate negative pressure in the accommodating cavity so as to create negative pressure in the enclosed space; and
- a release film that is covered over a side of the sealing member away from the housing to protect the sealing member.

* * * * *